United States Patent
Magari et al.

(10) Patent No.: US 8,053,114 B2
(45) Date of Patent: Nov. 8, 2011

(54) HYDROGEN-ABSORBING ALLOY ELECTRODE, ALKALINE STORAGE BATTERY, AND METHOD OF MANUFACTURING THE ALKALINE STORAGE BATTERY

(75) Inventors: Yoshifumi Magari, Kobe (JP); Jun Ishida, Kobe (JP); Shigekazu Yasuoka, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 1224 days.

(21) Appl. No.: 11/526,608

(22) Filed: Sep. 26, 2006

(65) Prior Publication Data

US 2007/0105018 A1    May 10, 2007

(30) Foreign Application Priority Data

Sep. 26, 2005   (JP) ................................. 2005-278192

(51) Int. Cl.
*H01M 4/00* (2006.01)
*H01M 4/13* (2010.01)
*H01M 4/58* (2010.01)

(52) U.S. Cl. .................. 429/223; 429/218.2; 429/218.1

(58) Field of Classification Search ............... 429/218.2, 429/527, 223, 218.1
See application file for complete search history.

(56) References Cited

U.S. PATENT DOCUMENTS

| | | | |
|---|---|---|---|
| 6,261,720 B1 * | 7/2001 | Kimiya et al. ................. | 429/223 |
| 6,416,903 B1 * | 7/2002 | Fierro et al. ................... | 429/223 |
| 6,432,580 B1 * | 8/2002 | Fierro et al. ................... | 429/223 |
| 6,703,164 B2 * | 3/2004 | Hayashida et al. ........ | 429/218.2 |
| 2003/0050188 A1 * | 3/2003 | Ovshinsky et al. ........... | 502/300 |
| 2004/0146782 A1 | 7/2004 | Yasuoka et al. ............ | 429/218.2 |
| 2004/0209166 A1 | 10/2004 | Kihara ....................... | 429/218.2 |
| 2005/0175896 A1 | 8/2005 | Ishida et al. ............... | 429/218.2 |

FOREIGN PATENT DOCUMENTS

| | | |
|---|---|---|
| CN | 2004-10001210.9 | 8/2004 |
| CN | 1655383 A | 8/2005 |
| JP | 2002-069554 A | 3/2002 |
| JP | 2002-080905 A | 3/2002 |
| JP | 2003-073703 | * 12/2003 |
| JP | 2004-179064 A | 6/2004 |
| JP | 2005-226084 A | 8/2005 |
| WO | 96/33518 A1 | 10/1996 |

OTHER PUBLICATIONS

Office Action dated Jan. 8, 2010, in Chinese Patent Application No. 2006101523327 and an English translation thereof.

* cited by examiner

*Primary Examiner* — Helen O Conley
(74) *Attorney, Agent, or Firm* — Kubovcik & Kubovcik

(57) ABSTRACT

Low temperature discharge capability and high rate discharge capability are improved in an alkaline storage battery that uses as its negative electrode a hydrogen-absorbing alloy electrode employing hydrogen-absorbing alloy particles containing at least nickel and a rare-earth element. An alkaline storage battery uses as the negative electrode a hydrogen-absorbing alloy electrode employing hydrogen-absorbing alloy particles containing at least nickel and a rare-earth element. The hydrogen-absorbing alloy particles have a surface layer and an interior portion, the surface layer having a nickel content greater than that of the interior portion, and nickel particles having a particle size within a range of from 10 nm to 50 nm are present in the surface layer.

11 Claims, 3 Drawing Sheets

HYDROGEN-ABSORBING ALLOY ELECTRODE, ALKALINE STORAGE BATTERY, AND METHOD OF MANUFACTURING THE ALKALINE STORAGE BATTERY

BACKGROUND OF THE INVENTION

1. Field of the Invention

The present invention relates to hydrogen-absorbing alloy electrodes for use as negative electrodes in alkaline storage batteries. The invention also relates to alkaline storage batteries and methods of manufacturing the alkaline storage batteries. More particularly, the invention relates to an improved hydrogen-absorbing alloy electrode for use as a negative electrode in an alkaline storage battery for improving the low temperature discharge capability and high rate discharge capability of the alkaline storage battery.

2. Description of Related Art

Conventionally, nickel-cadmium storage batteries have been commonly used as alkaline storage batteries. In recent years, nickel-metal hydride storage batteries employing a hydrogen-absorbing alloy as a material for their negative electrodes have drawn considerable attention in that they have higher capacity than nickel-cadmium storage batteries and that, being free of cadmium, they are more environmentally safe.

As alkaline storage batteries comprising the nickel-metal hydride storage batteries are used in various portable devices, demands for further higher performance in the alkaline storage batteries have been increasing.

In the alkaline storage batteries, hydrogen-absorbing alloys such as a rare earth-nickel hydrogen-absorbing alloy having a $CaCu_5$ crystal structure as its main phase and a Laves phase hydrogen-absorbing alloy containing Ti, Zr, V and Ni have been commonly used as the negative electrodes.

However, these hydrogen-absorbing alloys do not necessarily have sufficient hydrogen-absorbing capability, and it has been difficult to further enhance the capacity of the alkaline storage batteries.

In recent years, in order to improve the hydrogen-absorbing capability of the rare earth-nickel hydrogen-absorbing alloys, it has been proposed to use a hydrogen-absorbing alloy having a $Ce_2Ni_7$ type or a $CeNi_3$ type crystal structure, other than the $CaCu_5$ type, by adding Mg or the like to the rare earth-nickel hydrogen-absorbing alloy. (See, for example, Japanese Unexamined Patent Publication No. 2002-69554.)

Nevertheless, the alkaline storage battery that uses as the negative electrode a hydrogen-absorbing alloy electrode employing a hydrogen-absorbing alloy in which Mg or the like is added to the rare earth-nickel hydrogen absorbing alloy still has the problems of poorer high rate discharge capability and low temperature discharge capability than those of nickel-cadmium storage batteries.

On the other hand, Japanese Patent No. 3241047, for example, proposes a hydrogen storage alloy having a surface provided with enriched nickel regions of 7 nm or less in diameter so that the energy density and so forth can be improved.

Nevertheless, even with the use of the hydrogen-absorbing alloy having a surface provided with enriched nickel regions of 7 nm or less in diameter for an alkaline storage battery, electric charge does not transfer smoothly on the surface of the hydrogen-absorbing alloy, so it has been difficult to sufficiently improve high rate discharge capability and low temperature discharge capability.

BRIEF SUMMARY OF THE INVENTION

Accordingly, it is an object of the present invention to resolve the foregoing and other issues in the alkaline storage battery that uses as the negative electrode a hydrogen-absorbing alloy electrode employing a hydrogen-absorbing alloy. In particular, it is an object of the present invention to improve hydrogen-absorbing alloy particles used for the hydrogen-absorbing alloy electrode in the alkaline storage battery that employs a hydrogen-absorbing alloy electrode, the hydrogen-absorbing alloy particles containing at least nickel and a rare-earth element, so that the low temperature discharge capability and the high rate discharge capability of the alkaline storage battery can be improved.

In order to accomplish the foregoing and other objects, the present invention provides a hydrogen-absorbing alloy electrode comprising hydrogen-absorbing alloy particles containing at least nickel and a rare-earth element and having a surface layer and an interior portion, wherein the surface layer has a nickel content greater than that of the interior portion, and nickel particles having a particle size within a range of from 10 nm to 50 nm are present in the surface layer.

DETAILED DESCRIPTION OF THE INVENTION

Figure 1:
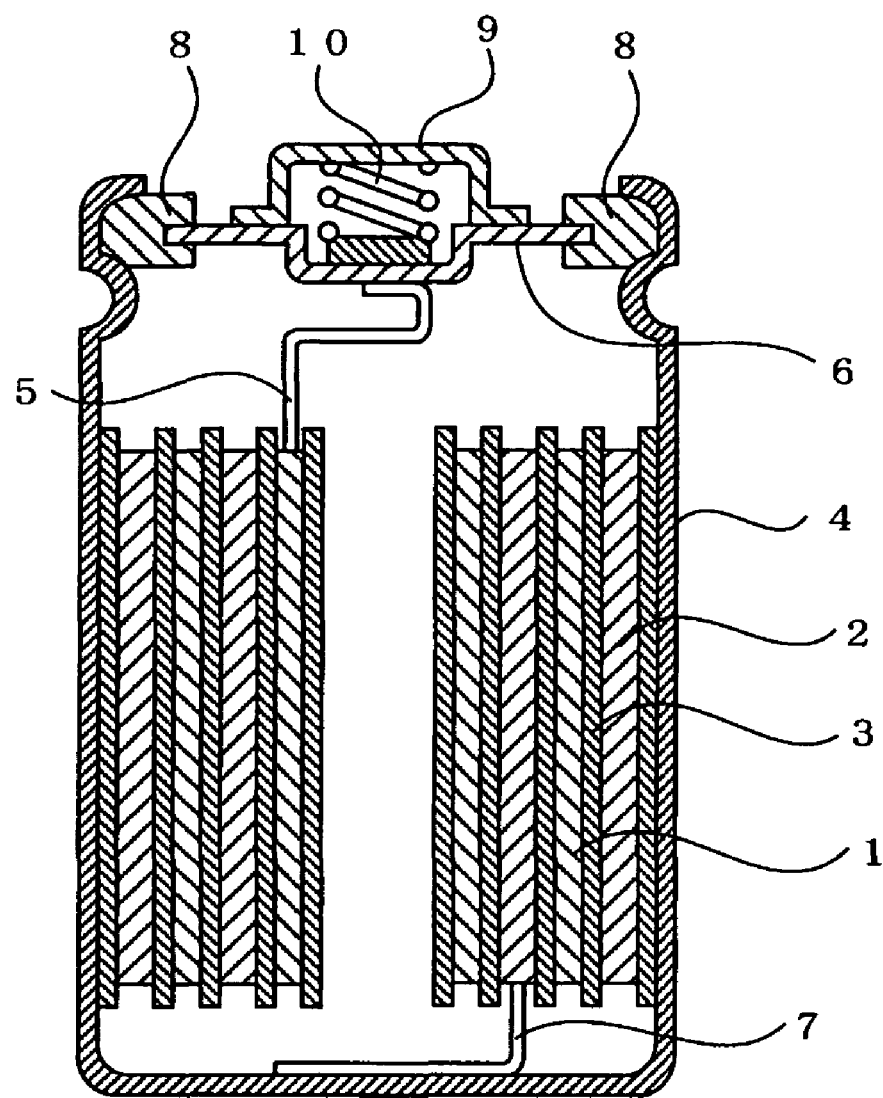
FIG. 1 is a schematic cross-sectional view illustrating an alkaline storage battery as prepared in Example 1 and Comparative Example 1 of the present invention.

A hydrogen-absorbing alloy electrode according to the present invention comprises hydrogen-absorbing alloy particles containing at least nickel and a rare-earth element. The hydrogen-absorbing alloy particles have a surface layer and an interior portion. The surface layer has a nickel content greater than that of the interior portion, and nickel particles having a particle size within a range of from 10 nm to 50 nm are present in the surface layer.

In the just-described hydrogen-absorbing alloy electrode, it is preferable that the nickel particles having a particle size within a range of from 10 nm to 50 nm be present in a surface side of the surface layer in a greater amount than in an inner side of the surface layer.

An alkaline storage battery according to the present invention employs the above-described hydrogen-absorbing alloy electrode as the negative electrode.

The alkaline storage battery employing the hydrogen-absorbing alloy electrode for the negative electrode as described above may be manufactured by a method comprising assembling an alkaline storage battery comprising a positive electrode, a negative electrode employing a hydrogen-absorbing alloy electrode comprising hydrogen-absorbing alloy particles containing at least nickel and a rare-earth element, and an alkaline electrolyte solution; thereafter heating the alkaline storage battery; and thereafter charging and discharging the alkaline storage battery.

In the just-described method, the hydrogen-absorbing alloy particles may comprise a hydrogen-absorbing alloy represented by the general formula $Ln_{1-x}Mg_xNi_{a-b-c}Al_bZ_c$, where Ln is at least one element selected from the group consisting of rare-earth elements; Z is at least one element selected from the group consisting of Zr, V, Nb, Ta, Cr, Mo, Mn, Fe, Co, Ga, Zn, Sn, In, Cu, Si, P, and B; $0.05 \leq x \leq 0.30$; $2.8 \leq a \leq 3.9$; $0.05 \leq b \leq 0.25$; and $0.01 \leq c \leq 0.25$. More preferably, the hydrogen-absorbing alloy is represented by the above-described general formula wherein x is 0.25 or greater.

ADVANTAGES OF THE INVENTION

In the present invention, the hydrogen-absorbing alloy electrode comprises hydrogen-absorbing alloy particles containing at least nickel and a rare-earth element and having a surface layer and an interior portion, wherein the surface layer has a nickel content greater than that of the interior portion, and nickel particles having a particle size within a range of from 10 nm to 50 nm are present in the surface layer. The nickel content in the surface layer is at least 8% greater than the nickel content in the interior portion. Therefore, the nickel present in the surface layer in a large amount serves to act as the active sites for the charge-discharge reactions, and moreover, electric charge flows into the interior of the hydrogen-absorbing alloy particles smoothly through the nickel particles having large particle sizes such as described above. Thus, the low temperature discharge capability and the high rate discharge capability of the alkaline storage battery is improved. It should be noted that if the particle size of the nickel particles is too large, the nickel particles inhibit transfer of protons. Therefore, it is preferable that the nickel particles have a particle size of 50 nm or less as described above.

In the above-described alkaline storage battery, when the nickel particles having a particle size within a range of from 10 nm to 50 nm are present in the surface side of the surface layer of the hydrogen-absorbing alloy particles in a greater amount than in the inner side thereof, electric charge is allowed to smoothly flow into the interior of the hydrogen-absorbing alloy particles quickly from the surface side through the nickel particles. Therefore, the low temperature discharge capability and high rate discharge capability of the alkaline storage battery are further improved. The content of the nickel particles having a particle size within a range of from 10 nm to 50 nm in the surface side of the surface layer is preferably 10% more than the content of these particles in the inner side of the surface layer to obtain these improvements.

In the present invention, the alkaline storage battery employing the above-described hydrogen-absorbing alloy electrode as the negative electrode may be manufactured by a method comprising assembling an alkaline storage battery comprising a positive electrode, a negative electrode employing a hydrogen-absorbing alloy electrode comprising hydrogen-absorbing alloy particles containing at least nickel and a rare-earth element, and an alkaline electrolyte solution; thereafter heating the alkaline storage battery; and thereafter charging and discharging the alkaline storage battery. This allows the rare-earth element(s), etc. contained in the hydrogen-absorbing alloy particles to dissolve in the surface side of the hydrogen-absorbing alloy particles, whereby a surface layer containing nickel in a greater amount than the interior portion of hydrogen-absorbing alloy particles is formed in the surface of the hydrogen-absorbing alloy particles and nickel particles having a particle size within a range of from 10 nm to 50 nm are formed in the surface layer. Here, when heating the assembled alkaline storage battery, the battery is heated at 35 to 70° C. for 6 to 48 hours. If the temperature is lower than 35° C., the desired effects cannot be obtained. If the temperature is higher than 70° C., an element of the negative electrode active material will be eluted and the surface layer will be different from that of the present invention and discharge characteristics will be deteriorated. If the heating time is too short, the desired effects cannot be obtained. If the heating time is too long, an element of the negative electrode active material will be eluted and the surface layer will be different from that of the present invention and discharge characteristics will be deteriorated.

When the hydrogen-absorbing alloy particles comprise a hydrogen-absorbing alloy represented by the general formula $Ln_{1-x}Mg_xNi_{a-b-c}Al_bZ_c$, where Ln is at least one element selected from the group consisting of rare-earth elements; Z is at least one element selected from the group consisting of Zr, V, Nb, Ta, Cr, Mo, Mn, Fe, Co, Ga, Zn, Sn, In, Cu, Si, P, and B; $0.05 \leq x \leq 0.30$; $2.8 \leq a \leq 3.9$; $0.05 \leq b \leq 0.25$; and $0.01 \leq c \leq 0.25$, the alkaline storage battery will achieve high capacity as well as good high rate discharge capability and good low temperature discharge capability because this hydrogen-absorbing alloy has a $Ce_2Ni_7$ type or similar crystal structure and thus high hydrogen-absorbing capability.

Here, in the hydrogen-absorbing alloy represented by the above general formula, the variable x, which indicates the amount of Mg, is controlled to be within the range of from 0.05 to 0.30 for the following reason. If x is less than 0.05, the crystal structure of the hydrogen-absorbing alloy greatly changes, degrading the hydrogen-absorbing capability, while if x is greater than 0.3, segregation of Mg occurs, degrading the cycle life of the alkaline storage battery. In addition, setting the variable x to be 0.25 or greater allows Mg to dissolve appropriately so that the nickel particles having a particle size within a range of from 10 nm to 50 nm can be formed appropriately in the surface layer when the assembled alkaline storage battery is heated and thereafter charged and discharged.

In the hydrogen-absorbing alloy represented by the above general formula, the variable a is controlled to be within a range of from 2.8 to 3.9 because, if the variable a falls outside this range, the crystal structure of the hydrogen-absorbing alloy changes greatly, degrading the hydrogen-absorbing capability. In addition, the variables b and c are controlled to be within the foregoing ranges for the following reason. If the variables b and c are below the foregoing ranges, corrosion resistance of the hydrogen-absorbing alloy lowers, degrading the cycle life of the alkaline storage battery. On the other hand, if the variables b and c exceed the foregoing ranges, the crystal structure of the hydrogen-absorbing alloy changes greatly, considerably degrading the hydrogen-absorbing capability.

EXAMPLES

Hereinbelow, examples of the hydrogen-absorbing alloy electrode, the alkaline storage battery, and the method of manufacturing the alkaline storage battery according to the present invention are described in detail along with comparative examples, and it will be demonstrated that the examples of the alkaline storage battery exhibit improvements in low temperature discharge capability and high rate discharge capability. It should be construed that the hydrogen-absorbing alloy electrode, the alkaline storage battery, and the method of manufacturing the alkaline storage battery according to the present invention are not limited to those shown in the following examples, and various changes and modifications are possible without departing from the scope of the invention.

Example 1

In Example 1, a hydrogen-absorbing alloy electrode for use as a negative electrode of an alkaline storage battery was prepared in the following manner. A rare-earth element La was mixed with Mg, Ni, Al, and Co so that a predetermined alloy composition was obtained. Then, the mixture was melted in an argon atmosphere and then cooled to obtain an ingot of hydrogen-absorbing alloy having the composition $La_{0.75}Mg_{0.25}Ni_{3.2}Al_{0.1}Co_{0.1}$.

Then, the ingot of the hydrogen-absorbing alloy was annealed so that the alloy texture was made uniform in quality, and thereafter the ingot of the hydrogen-absorbing alloy was mechanically pulverized in an inert atmosphere. The pulverized alloy was then classified to obtain a powder of the hydrogen-absorbing alloy having the foregoing composition and a volume average particle size of 65 μm.

The hydrogen-absorbing alloy powder thus prepared was subjected to X-ray diffraction analysis. The X-ray diffraction analysis was carried out with the use of an X-ray diffraction analyzer (RINT2000 system, made by Rigaku Corp.) that uses Cu—Kα radiation as an X-ray source at a scan speed of 1°/min. and a scan step of 0.02° in a scan range of 10° to 80°. As a result, it was found that the main phase of the hydrogen-absorbing alloy had a $Ce_2Ni_7$ type crystal structure.

Next, 1 part by weight of styrene-butadiene copolymer rubber, 0.2 parts by weight of sodium polyacrylic acid, and 0.2 parts by weight of carboxymethylcellulose, serving as binder agents, were added to 100 parts by weight of the just-described hydrogen-absorbing alloy powder. Further, 1 part by weight of nickel metal flake and 1 part by weight of carbon black, which are conductive powders, and 50 parts by weight of water were added to the just-described mixture, and the resultant mixture was kneaded to prepare a paste. The resultant paste was applied onto both sides of a conductive core substrate made of a punched metal, and was then dried. The resultant material was pressed and thereafter cut into predetermined dimensions. Thus, a hydrogen-absorbing alloy electrode for use as the negative electrode was obtained.

A positive electrode was prepared as follows. Nickel hydroxide powder containing 2.5 weight % of zinc and 1.0 weight % of cobalt was put into an aqueous solution of cobalt sulfate, and 1 mole of an aqueous solution of sodium hydroxide was gradually dropped into the mixture with stirring to cause them to react with each other until the pH became 11. Thereafter, the resulting precipitate was filtered, washed with water, and vacuum dried. Thus, nickel hydroxide, the surface of which was coated with 5 weight % cobalt hydroxide, was obtained.

Next, a 25 weight % aqueous solution of sodium hydroxide was added and impregnated into the nickel hydroxide, the surface of which was coated with cobalt hydroxide, at a weight ratio of 1:10, and the resultant was heated at 85° C. for 8 hours with stirring. Thereafter, this was washed with water and dried, whereby a positive electrode material was obtained, in which the surface of the just-described nickel hydroxide was coated with a sodium-containing cobalt oxide. In the cobalt oxide, the valence of cobalt was 3.05.

Subsequently, 95 parts by weight of the positive electrode material thus prepared, 3 parts by weight of zinc oxide, and 2 parts by weight of cobalt hydroxide were mixed together, and 50 parts by weight of an aqueous solution of 0.2 weight % hydroxypropylcellulose was added to the mixture. These were mixed together to prepare a slurry. The slurry was then filled into a nickel foam having a weight per unit area of 600 g/m², a porosity of 95%, and a thickness of about 2 mm. The resultant was dried and pressed, and thereafter cut into predetermined dimensions. Thus, a positive electrode of a non-sintered nickel electrode was obtained.

Next, using the positive electrode and the negative electrode prepared in the above-described manner, an alkaline storage battery was assembled. A nonwoven fabric made of polypropylene was used as a separator. An alkaline aqueous solution that contained KOH, NaOH, and LiOH in a weight ratio of 15:2:1 and had a specific gravity of 1.30 was used as an alkaline electrolyte solution. Thus, an AA size cylindrical alkaline storage battery as shown in FIG. 1 with a design capacity of 1500 mAh was fabricated.

The just-described alkaline storage battery was fabricated according to the following manner. The positive electrode 1 and the negative electrode 2 were spirally coiled with the separator 3 interposed therebetween, as illustrated in FIG. 1, and these were accommodated in a battery can 4. Then, the alkaline electrolyte solution was poured into the battery can 4. Thereafter, an insulative packing 8 was placed between the battery can 4 and a positive electrode cap 6, and the battery can 4 was sealed. The positive electrode 1 was connected to the positive electrode cap 6 by a positive electrode lead 5, and the negative electrode 2 was connected to the battery can 4 via a negative electrode lead 7. The battery can 4 and the positive electrode cap 6 were electrically insulated by the insulative packing 8. A coil spring 10 was placed between the positive electrode cap 6 and a positive electrode external terminal 9. The coil spring 10 can be compressed to release gas from the interior of the battery to the atmosphere when the internal pressure of the battery unusually increases.

Next, the alkaline storage battery fabricated in the above-described manner was set aside in air at a temperature of 45° C. for 12 hours. Thereafter, the alkaline storage battery was charged at a current of 150 mA for 16 hours and thereafter set aside for 1 hour. Thereafter, the alkaline storage battery was discharged at a current of 300 mA until the battery voltage reached 1.0 V, and set aside for 1 hour. This charge-discharge cycle was repeated three times, whereby an alkaline storage battery of Example 1 was obtained.

Comparative Example 1

In Comparative Example 1, an alkaline storage battery was assembled in the same manner as in Example 1 above, except that a hydrogen-absorbing alloy having the composition $(La_{0.8}Ce_{0.14}Pr_{0.02}Nd_{0.04})Ni_{3.70}Co_{0.90}Mn_{0.30}Al_{0.30}$ was used as the hydrogen-absorbing alloy. The assembled alkaline storage battery was not heated and was charged and discharged in the same manner as in Example 1 above. Thus, an alkaline storage battery of Comparative Example 1 was obtained.

Then, the thus-prepared alkaline storage batteries of Example 1 and Comparative Example 1 were disassembled, and the hydrogen-absorbing alloy particles in their respective negative electrodes were taken out, washed with water, and then dried under reduced pressure. The respective hydrogen-absorbing alloy particles were dispersed between substrates, which were bonded with a resin, and the substrates were then cut and polished, so that the cross-sectional structures of the respective hydrogen-absorbing alloy particles could be observed with a transmission electron microscope (field emission transmission electron microscope JEM-2010F made by JEOL Ltd.).

Figure 2:
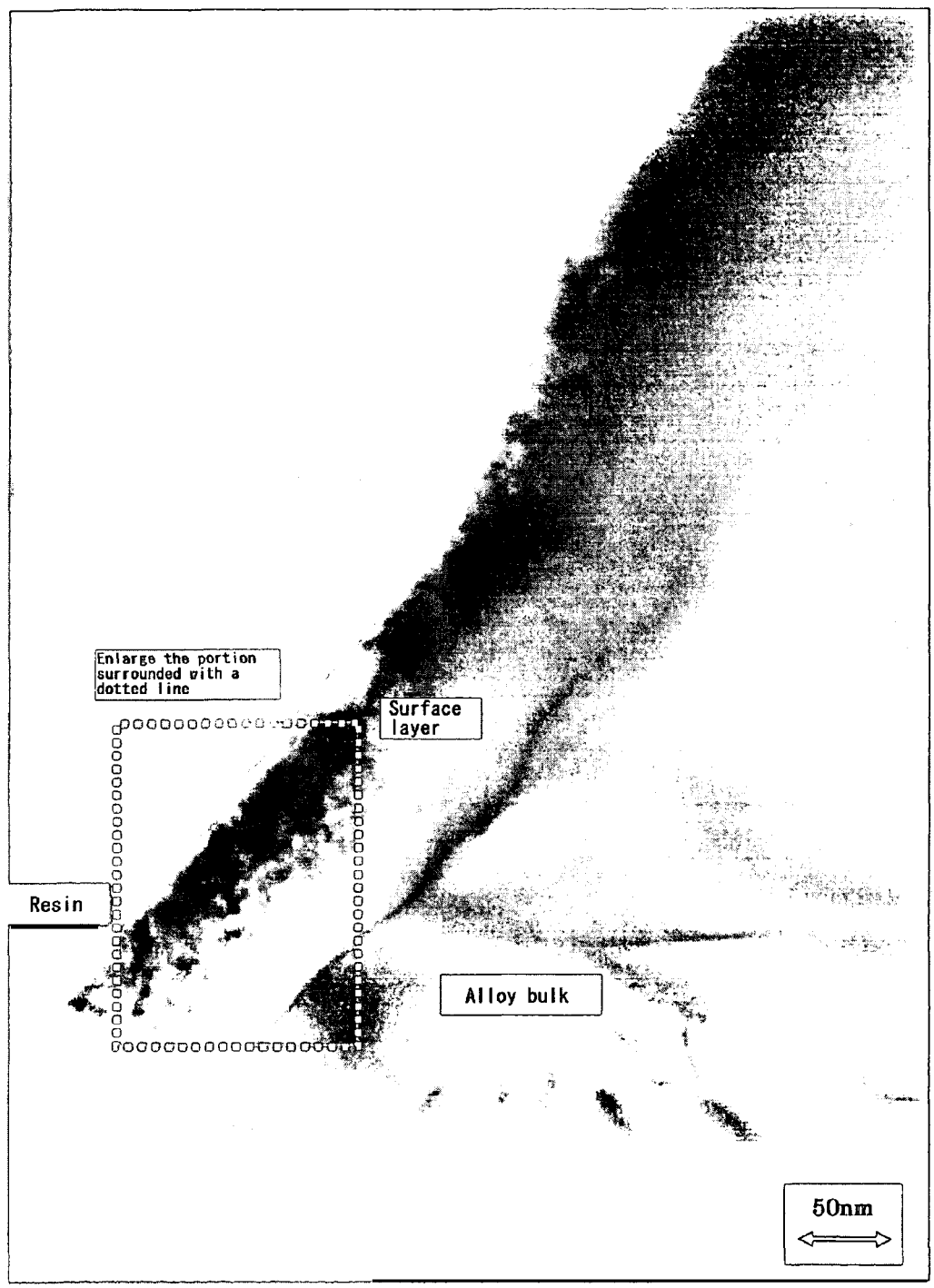
FIG. 2 is a transmission electron micrograph illustrating the cross-sectional structure of a hydrogen-absorbing alloy particle in an alkaline storage battery of Example 1 according to the present invention.
Figure 3:
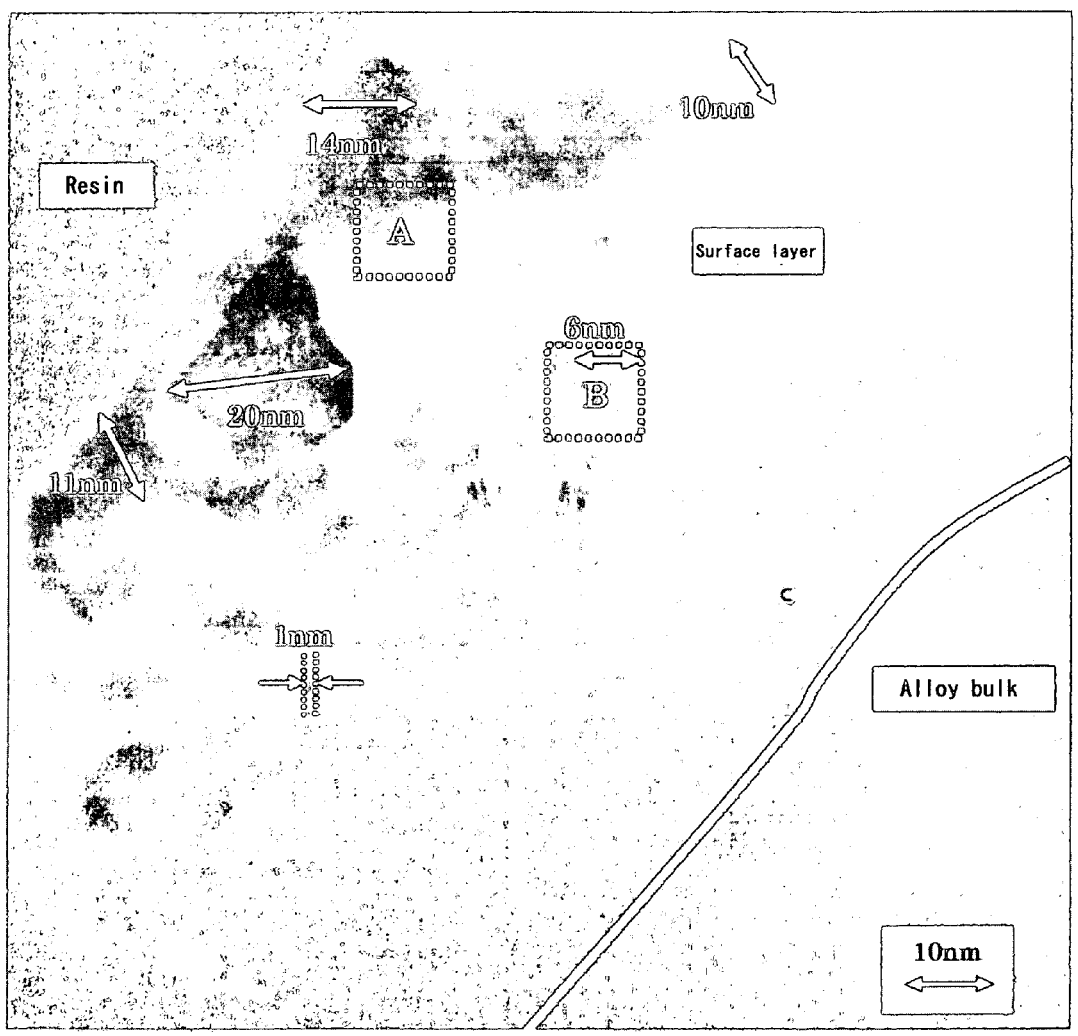
FIG. 3 is a transmission electron micrograph illustrating a portion of the surface side of the hydrogen-absorbing alloy particle shown in FIG. 2 enlarged.

FIG. 2 shows a transmission electron micrograph illustrating the cross-sectional structure of a hydrogen-absorbing alloy particle in the alkaline storage battery of Example 1 above, and FIG. 3 shows an enlarged view of a surface-side portion of the hydrogen-absorbing alloy particle shown in FIG. 2.

For the hydrogen-absorbing alloy particles in the alkaline storage battery of Example 1 above, the respective compositions of a region A and a region B, which are in the surface layer, and a bulk portion of the alloy, shown in FIG. 3, were analyzed with an energy-dispersive X-ray diffraction analyzer (Si(Li) semiconductor detector UTW, made by Noran Instruments Inc.). The results are shown in Table 1 below. In addition, the crystal structure was analyzed by electron diffraction analysis.

TABLE 1

|  | Region A | Region B | Bulk |
|---|---|---|---|
| Ni (atom %) | 87.8 | 79.3 | 73 |
| La (atom %) | 0.7 | 9.1 | 17 |
| Mg (atom %) | 0.1 | 0 | 6 |
| Al (atom %) | 0.4 | 0.8 | 2 |

The results demonstrate that in the hydrogen-absorbing alloy particles in the alkaline storage battery of Example 1, the proportions of Ni in the regions A and B in the surface layer were greater than the proportion of Ni in the bulk portion, and that, as shown in FIG. 3, particles having a particle size of 10 nm or greater were present in the surface side of the surface layer of the hydrogen-absorbing alloy particles. These particles having a particle size of 10 nm or greater were analyzed with the electron diffraction analysis, and as a consequence, it was found that these particles were highly crystalline nickel particles.

In contrast, in the hydrogen-absorbing alloy particles in the alkaline storage battery of Comparative Example 1, small nickel particles having particle sizes of from about 1 nm to about 5 nm were observed in the surface layer of the hydrogen-absorbing alloy particles, but no nickel particle having a particle size of 10 nm or greater was observed.

Next, alkaline storage batteries of Example 1 and Comparative Example 1, prepared in the above-described manners, were charged at a current of 1500 mA at a temperature of 25° C. until the battery voltage reached the maximum value, and then further charged until the battery voltage was reduced by 10 mV. Then, the batteries were set aside for 1 hour and thereafter discharged at a high current of 6000 mA until the battery voltage reached 1.0 V, to determine the discharge capacities of the respective alkaline storage batteries at high current. Taking the discharge capacity of the alkaline storage battery of Example 1 as 100, the high rate discharge capability of the alkaline storage battery of Comparative Example 1 was expressed by a relative index to the discharge capacity of the alkaline storage battery of Example 1. The results are shown in Table 2 below.

In addition, low temperature discharge capability of alkaline storage batteries of Example 1 and Comparative Example 1 were determined as follows. The alkaline storage batteries of Example 1 and Comparative Example 1 as described above were charged at a current of 1500 mA at a temperature of 25° C. until the battery voltage reached the maximum value, and then further charged until the battery voltage was reduced by 10 mV. Then, the batteries were set aside for 3 hours at a temperature of −10° C. and thereafter discharged at a current of 1500 mA at a temperature of −10° C. until the battery voltage reached 1.0 V, to determine the low temperature discharge capabilities of the respective alkaline storage batteries. Taking the low temperature discharge capability of the alkaline storage battery of Example 1 as 100, the low temperature discharge capability of the alkaline storage battery of Comparative Example 1 was expressed by a relative index to the low temperature discharge capability of the alkaline storage battery of Example 1. The results are also shown in Table 2 below.

TABLE 2

|  | High rate discharge capability | Low temperature discharge capability |
|---|---|---|
| Example 1 | 100 | 100 |
| Comparative Example 1 | 81 | 58 |

The results demonstrate that the alkaline storage battery of Example 1 exhibited significant improvements in both the high rate discharge capability and low temperature discharge capability over the alkaline storage battery of Comparative Example 1.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

This application claims priority of Japanese patent application No. 2005-278192 filed Sep. 26, 2005, which is incorporated herein by reference.

What is claimed is:

1. A hydrogen-absorbing alloy electrode comprising hydrogen-absorbing alloy particles containing at least nickel and a rare-earth element, said particles having a surface layer and an interior portion, wherein the surface layer has a nickel content greater than that of the interior portion, and nickel particles having a particle size within a range of from 10 nm to 50 nm are present in the surface layer, wherein the hydrogen-absorbing alloy particles comprise a hydrogen-absorbing alloy represented by the general formula $Ln_{1-x}Mg_x Ni_{a-b-c}Al_b Z_c$, where Ln is at least one element selected from the group consisting of rare-earth elements; Z is at least one element selected from the group consisting of Zr, V, Nb, Ta, Cr, Mo, Mn, Fe, Co, Ga, Zn, Sn, In, Cu, Si, P, and B; $0.05 \leq x \leq 0.30$; $2.8 \leq a \leq 3.9$; $0.05 \leq b \leq 0.25$; and $0.01 \leq c \leq 0.25$.

2. The hydrogen-absorbing alloy electrode according to claim 1, wherein the nickel particles having a particle size within a range of from 10 nm to 50 nm are present in a surface side of the surface layer in a greater amount than in an inner side of the surface layer.

3. An alkaline storage battery comprising a positive electrode, a negative electrode, and an alkaline electrolyte solution, the negative electrode being a hydrogen-absorbing alloy electrode according to claim 1.

4. A method of manufacturing an alkaline storage battery according to claim 3, the method comprising:
assembling an alkaline storage battery comprising a positive electrode, a negative electrode employing a hydrogen-absorbing alloy electrode comprising hydrogen-absorbing alloy particles containing at least nickel and a rare-earth element, and an alkaline electrolyte solution;
thereafter heating the alkaline storage battery; and
thereafter charging and discharging the alkaline storage battery.

5. The method according to claim 4, wherein, in the general formula, x is 0.25 or greater.

6. An alkaline storage battery comprising a positive electrode, a negative electrode, and an alkaline electrolyte solution, the negative electrode being a hydrogen-absorbing alloy electrode according to claim 2.

7. A method of manufacturing an alkaline storage battery according to claim 6, the method comprising:

assembling an alkaline storage battery comprising a positive electrode, a negative electrode employing a hydrogen-absorbing alloy electrode comprising hydrogen-absorbing alloy particles containing at least nickel and a rare-earth element, and an alkaline electrolyte solution;

thereafter heating the alkaline storage battery; and thereafter charging and discharging the alkaline storage battery.

8. The method according to claim 7, wherein, in the general formula, x is 0.25 or greater.

9. The hydrogen-absorbing alloy electrode according to claim 1, wherein, in the general formula, x is 0.25 or greater.

10. The hydrogen-absorbing alloy electrode according to claim 9, wherein the nickel particles having a particle size within a range of from 10 nm to 50 nm are present in a surface side of the surface layer in a greater amount than in an inner side of the surface layer.

11. An alkaline storage battery comprising a positive electrode, a negative electrode, and an alkaline electrolyte solution, the negative electrode being a hydrogen-absorbing alloy electrode according to claim 9.

* * * * *